United States Patent [19]

McCormick et al.

[11] 4,293,089

[45] Oct. 6, 1981

[54] BRAZING METHOD

[75] Inventors: James T. McCormick, Simi; Paul B. Ferry, Encino, both of Calif.; John C. Hall, Schaumburg, Ill.

[73] Assignee: The United States of America as represented by the United States Department of Energy, Washington, D.C.

[21] Appl. No.: 37,076

[22] Filed: May 8, 1979

[51] Int. Cl.$^3$ .......................... B23K 1/04; B23K 1/20
[52] U.S. Cl. .................................. 228/215; 228/118; 228/263 B; 228/263 R
[58] Field of Search ........... 228/118, 216, 215, 263 R, 228/181, 263 B, 254

[56] References Cited

U.S. PATENT DOCUMENTS

| | | | |
|---|---|---|---|
| 2,962,811 | 12/1960 | Herbert, Jr. | 228/181 |
| 3,129,502 | 4/1964 | Olson | 228/254 |
| 3,224,071 | 12/1965 | Levi et al. | 228/215 X |
| 3,246,387 | 4/1966 | Duran et al. | 228/254 X |
| 3,906,617 | 9/1975 | Behringer et al. | 228/215 X |
| 4,003,753 | 1/1977 | Hall | 429/199 |

*Primary Examiner*—Kenneth J. Ramsey
*Attorney, Agent, or Firm*—Frank H. Jackson; Dean E. Carlson; James E. Denny

[57] ABSTRACT

There is disclosed a positive cathode electrode structure formed by brazing a thin porous membrane to a backing material by preselecting a predetermined area of the thin porous membrane and thereafter providing a braze flow barrier throughout the remainder of the membrane and electrolessly plating a nickel-phosphide alloy on the backing material, or in this case the honeycomb structure. The preselected area of the thin porous membrane is placed in intimate contact with the electrolessly plated portion of the backing material and heated to elevated temperatures in the absence of oxygen to form a brazed joint limited to a preselected area. If the braze flow barrier is provided by application of a liquid organic solvent, then the organic solvent is driven off by maintaining the thin porous membrane at elevated temperatures for an extended period of time prior to the brazing operation.

14 Claims, No Drawings

BRAZING METHOD

CONTRACTUAL ORIGIN OF THE INVENTION

The invention described herein was made in the course of, or under, a contract with the U.S. DEPARTMENT of ENERGY.

BACKGROUND OF THE INVENTION

This invention relates to a method of brazing a porous material to a background material, and more specifically, this invention relates to a method in which a braze flow barrier is provided which defines a preselected area of the porous material in order to contain and limit braze flow during the formation of the braze joint.

Research and development of rechargeable liquid molten salt batteries has been progressing on a large scale for several years. In these batteries, a molten electrolyte such as a eutectic combination of lithium chloride and potassium chloride having a melting point of 352° C. is employed between several parallel-connected anodes and cathodes. Electrical insulation between the electrodes is provided by porous ceramic separators which permit ionic conduction through the molten eutectic potassium chloride and lithium chloride electrolyte. Because of the corrosive nature of the electrolytes and the operating temperatures necessitated, such as 400° C. or above, substantial developments has been necessary to provide corrosion resistant materials from which to construct the negative anode electrodes and the positive cathode electrodes as well as the separators and therebetween.

A rechargeable lithium-silicon/iron sulfide load-leveling battery which utilizes a lithium chloride/potassium chloride eutectic electrolyte provides a very attractive combination due to its potential long life. Development of a corrosion resistant positive cathode electrode for the iron sulfide has been a primary objective. A honeycomb structure which is useful to prevent swelling, slumping and extrusion of the active iron sulfide material during battery operation has been described in U.S. Pat. No. 4,003,753 issued Jan 18, 1977 to John C. Hall for Electrode Structure For Electrical Energy Storage Device, the disclosure of which is incorporated herein by reference. This patent discloses a honeycomb structure for storing the positive cathode electrode active material connected to a porous membrane which acts as a barrier between the positive cathode electrode active material and the molten lithium chloride/potassium chloride eutectic electrolyte. For proper operation of the battery, it is essential that the porous nature of the membrane remain intact, thereby to permit the beforementioned ionic conduction through the electrolyte between the electrodes.

Various metals are acceptable for use as porous membranes, the membranes generally being thin, having a thickness less than one millimeter thick and preferrably having a thickness of about 0.25 millimeters. Porosity and pore size of the membrane may vary considerably; however, an acceptable membrane may have a porosity in the order of about 40% with a pore size of about 2 microns. Available and acceptable materials for the porous membrane is any material with the requisite porosity, corrosion resistance and melting point which can be suitably connected to the associated electrode and include nickel, the Hastalloys, the Inconels, other nickel-iron alloys, various stainless steels and various carbon steels.

Because of the nature of the liquid metal batteries, it is necessary to have a thermodynamically acceptable material connecting or bonding the thin porous membrane to the positive cathode electrode structure, of honeycomb in this particular battery application. Because of the complex physical structure of the honeycomb, brazing is particularly attractive as opposed to other methods of connecting or bonding the membrane and the electrode structure. A potential braze material, which the thermodynamic considerations indicate should have an acceptable corrosion resistance is nickel phosphide. The nickel-phosphorous phase diagram discloses a eutectic with a melting point of 880° C. and a composition of 89 weight percent nickel and 11 weight percent phosphorous. An alloy of this composition or one having a higher phosphorous content may be electrolessly deposited on various substrates according to the method disclosed in the Guitzeit et al. U.S. Pat. No. 2,690,401, the Talmey et al. U.S. Pat. No. 3,325,297 and the Parker et al. U.S. Pat. No. 3,887,732, the disclosure of the last named patent being incorporated herein by reference.

The problem incurred in attempting to form a braze joint between a porous membrane and a substrate is that at the elevated temperatures necessary to form the brazed joint, the braze material wicks or flows through the porous membrane, thereby substantially sealing the pores and rendering the membrane ineffective for use as a structural member in the positive cathode electrode in a liquid metal-molten salt battery which requires ionic conduction through the porous structural member.

SUMMARY OF THE INVENTION

According to the present invention, a positive cathode electrode structure is provided by brazing a thin porous membrane to a backing material by preselecting a predetermined area of the thin porous membrane and thereafter providing a braze flow barrier throughout the remainder of the membrane and electrolessly plating a nickel-phosphide alloy on the backing material, or in this case the honeycomb structure. Then the preselected area of the thin porous membrane is placed in intimate contact with the electrolessly plated portion of the backing material and heated to elevated temperatures in the absence of oxygen to form a brazed joint limited to a preselected area. If the braze flow barrier is provided by application of a metal oxide dispersed in a liquid organic solvent, then the organic solvent is driven off by maintaining the thin porous membrane at elevated temperatures for an extended period of time prior to the brazing operation.

DETAILED DESCRIPTION OF THE INVENTION

In order to prepare the positive cathode electrode structure of the present invention, a honeycomb constructed in accordance with the disclosure of the aforementioned Hall U.S. Pat. No. 4,003,753 of 1010 carbon steel was plated with 0.1/1000ths of an inch of nickel phosphide alloy from a Kanigen bath. Kanigen is a registered trademark of the General American Transportation Company and represents a large number of proprietary electroless nickel plating baths and systems for electroless plating. A typical bath may include 0.09M $NiSO_4.6H_2O$, 0.23M $NaH_2.PO_2.H_2O$ and 0.3M lactic acid in deionized water. Minor amounts of exaltants, stabilizers and wetting agents, all well known in the art may be added. The pH of the bath is adjusted, as needed, with a 10% NaOH solution, and in general, the operating temperature of the bath is usually controlled within plus or minus 1° C. After the honeycomb was plated with a nickel phosphide coating having a phosphorous content of about 11%, the pH of the bath being maintained at 4 or less, an attempt was made to braze the honeycomb to a porous nickel membrane material. The membrane material was metallic nickel 0.25 millimeters thick having pores of about 2 microns in size and an overall porosity of about 40%. The honeycomb and the nickel membrane were placed in intimate contact and maintained thereat by a graphite clamp. The construction was heated to about 950° C. in a vacuum. After cooling, the brazed joint was examined and the structure was found to be unsatisfactory.

The brazed material, that is the nickel phosphide alloy which had been electrolessly plated on the honeycomb structure had completely wicked through the porous nickel membrane and plugged the structure. In order to fabricate liquid metal batteries it is necessary that ionic conduction from the molten electrolyte take place with both the positive electrode material and the negative electrode material. In the present case, iron sulfide is the positive cathode electrode active material, and ionic conduction between the iron sulfide and the molten potassium chloride-lithium chloride eutectic electrolyte must exist for an operative battery. Accordingly, as initially developed, the brazing method using an electrolessly deposited nickel phosphide alloy was unsatisfactory.

A Nicrobraze Red Stopoff was utilized to limit the area of braze flow on the porous nickel membrane. Nicrobraze Red Stopoff is a proprietary material which apparently contains titanium dioxide dispersed in a organic carrier such as alcohol. The porous nickel membrane was soaked in the Nicrobraze Red Stopoff and the solvent was removed by drying the membrane in a vacuuum oven at approximately 100° C. Residue Stopoff was removed from one surface of the porous nickel membrane by abrasion with steel wool, and thereafter that surface was abutted to a previously electrolessly plated honeycomb. The two members, that being the porous membrane having the Stopoff distributed therethrough except on the one surface thereof and the electrolessly nickel plated honeycomb were maintained in close relationship by means of graphite clamps and introduced into a vacuum oven. The parts were first heated to approximately 750° C. and maintained at that temperature for about an hour at a vacuum of about $5 \times 10^{-4}$ torr to remove all residual organic matter. Thereafter, the temperature was quickly raised, within approximately 20 minutes, to 950° C. and maintained for 10 minutes. After the brazed joint was formed the combined structure was allowed to cool to ambient temperatures at vacuum pressure.

Upon inspection of the brazed joint thus formed, it was found that an effective corrosion resistant brazed joint was formed between the honeycombed backing material and the porous nickel membrane. Most importantly, however, the braze material, this being the nickel phosphide alloy did not flow or wick throughout the porous membrane but rather was restricted to the surface which previously had been abraded to remove the Nicrobraze Red Stopoff. Although the nickel phosphide alloy plated onto the honeycomb was only 0.1/1000ths of an inch thick, a sufficient amount of material was present effectively to braze the honeycomb to the porous nickel membrane.

Almost any material may be used for the porous membrane which is thermodynamically suitable for the intended end use. For the presently intended use as a cathode structure in a liquid metal battery, various Hastalloys such as Hastalloy B, common nickel or iron based alloys, stainless steel, carbon steel, or Inconels may all be used in place of the nickel membrane previously described. With respect to pore size and porosity, there is no specific requirements, either minimum or maximum, as pertains to the method of the present invention. Although, the end use may determine both porosity and pore size. The same conditions with respect to the materials available for the membrane structure, apply to the backing material, which in the present case was a 1010 carbon steel but may also be other carbon steels or for that matter any of the above-mentioned materials applicable to the membrane. Most importantly is that the backing material, whatever its composition, be capable of accepting an electroless nickel alloy deposit. As stated in U.S. Pat. No. 2,658,839 issued to Talmey et al., Nov. 10, 1953, iron, cobalt, nickel, palladium, aluminum, copper, silver, gold and platinum all may be used as substrates on which to deposit electroless nickel-phosphide alloys, with some of the aforementioned materials in and of themselves being noncatalytic but capable of being made catalytic by the addition of various materials, all as is well known in the art.

The nickel phosphide alloy electrolessly plated onto the backing material may also be plated onto the preselected area of the membrane material, either in addition to or in lieu of plating on the backing material. It is preferred, that the least amount of braze material be used for the presently contemplated liquid metal-molten salt batteries; however, it is certainly within the parameters of the present invention to plate both the porous membrane as well as the backing material. With respect to the phosphorous content of the nickel phosphide alloy, it may vary dependent only upon the capability of the electroless plating process. For instance the beforementioned Kanigen process is capable of electrolessly plating nickel phosphide alloys having phosphorous contents approaching 13% by weight. The most significant considerations are the melting temperature of the nickel phosphorous alloy, the corrosion resistance of same and the integrity of the material as a braze material. In general, the higher the phosphorous content of the nickel phosphide alloy the higher the melting temperature. For the eutectic 11% by weight nickel-phosphide alloy, the melting point is 880° C. When the phosphorous content approaches 13% by weight, the melting point approaches about 1,000° C.

With respect to the use of and the alternatives for the disclosed Nicrobraze Red Stopoff, any commercially available material may be substituted. Generally, metal oxides such as aluminum oxide, titanium dioxide or magnesium oxide dispersed in a liquid organic solvent will capably function for the intended purpose. Alternatives to the aforementioned oxides are boron nitride and magnesium hydroxide, also dispersed in a suitable organic solvent. It is possible to dispense with the organic solvent if the porous material is capable of being saturated with a fine powder. The organic solvent method of applying the stopoff is preferred. During the process hereinbefore described, the juxtaposed and clamped parts were maintained at vacuum pressures for approximately 1 hour at a temperature of about 750° C. prior to brazing. The purpose of this soak time is to drive off the solvent, and if lower temperatures and shorter soak times are sufficient to remove the solvent, then the soak time may be varied accordingly. Conversely, if no solvent has been used, this step may be dispensed with in its entirety.

The entire process of solvent removal and braze joint formation was described as taking place in a vacuum at approximately $5 \times 10^{-4}$ torr, the importance of the vacuum being the absence of oxygen. To this end, protective atmospheres may be used in lieu of the vacuum.

In the present process the braze flow barrier or stopoff was applied in a solvent by literally soaking the membrane in the liquid stopoff. Thereafter, the surface to be brazed was treated by physically abrading the surface with steel wool to remove the braze flow barrier. Clearly, other methods of removing the stopoff or braze flow barrier are available and may be substituted for the previously described physical abrading method. The critical aspect of the present invention is the prior treatment of the porous membrane with a material which limits the flow of braze and acts as a barrier at the elevated temperatures necessary to form the braze joints, followed by removal of the material from a preselected area. Clearly, any predetermined shape or preselected portion of the membrane may not be pretreated with a stopoff, thereby being in condition to accept the braze material, the remainder of the membrane being treated and impervious to the braze alloy.

While there has been described what at present is considered to be the preferred embodiment of the present invention, it will be understood that various modifications and alterations may be made therein, and it is intended to cover in the appended claims all such modifications and alterations.

The embodiments of the invention in which an exclusive property or privilege is claimed are defined as follows:

1. A method of brazing a thin porous membrane selected from the class consisting of iron, nickel, copper and alloys thereof to a backing material comprising preselecting the surface area of the thin porous membrane to be brazed, soaking the thin porous membrane in a braze flow barrier dispersed in a volatile carrier and thereafter removing the braze flow barrier from the preselected porous surface area, preselecting the surface area of the backing material to be brazed, electrolessly plating a metal alloy on the backing material, placing said preselected surface areas in registered contact, heating in the absence of oxygen to a temperature in excess of the melting point of the electroless plated metal alloy for a time sufficient to volatilize the carrier and to form a braze joint between the preselected surface areas, and thereafter cooling to ambient temperatures to provide a brazed backing and porous membrane with the pores of the membrane being open except at the braze joint.

2. The method set forth in claim 1, wherein the backing material is selected from a class consisting of iron, nickel, copper and their alloys.

3. The method set forth in claim 1, wherein the electrolessly plated metal alloy is a nickel phosphide alloy having a phosphorous content between about 7% by weight and about 13% by weight.

4. The method set forth in claim 3, wherein the phosphorous content is above about 11% by weight.

5. The method set forth in claim 1, wherein the flow barrier is a metal oxide or hydroxide capable of preventing braze flow at elevated temperatures.

6. The method set forth in claim 1, wherein the heating is in a vacuum environment.

7. The method set forth in claim 1, wherein the heating is in a protective atmosphere.

8. The method set forth in claim 1, wherein the heating takes place in a time period in the range of between about 5 minutes and about 30 minutes.

9. The method set forth in claim 8, wherein the heating time period is less than about 15 minutes.

10. A method of brazing a thin porous metal membrane wherein the pore size is about 2 microns to a backing material comprising, selecting a predetermined surface area of the porous metal membrane to be brazed, soaking the thin porous membrane in a braze flow barrier dispersed in a volatile organic carrier, abrasively removing the braze flow barrier from the preselected surface area of the porous metal membrane, selecting a predetermined surface area of the backing material to be brazed, electrolessly plating a nickel phosphide alloy on the preselected surface of the backing material, removing the organic carrier from the porous metal membrane, placing said preselected areas in registered contact, heating in the absence of oxygen to a temperature in excess of the melting point of the deposited nickel phosphide alloy for a time sufficient to form a braze joint between the preselected surface areas, and thereafter cooling to ambient temperature to provide a brazed backing and porous membrane with the pores of the membrane being open except at the braze joint.

11. The method set forth in claim 10, wherein the porous metal membrane is less than about one millimeter in thickness.

12. The method set forth in claim 10, wherein the metal membrane is nickel.

13. The method set forth in claim 10, wherein the backing material is a carbon steel honeycomb structure.

14. The method set forth in claim 10, wherein the nickel phosphide alloy has a phosphorous content of at least 11% by weight.

* * * * *